(12) United States Patent
Finkl et al.

(10) Patent No.: US 6,398,885 B1
(45) Date of Patent: Jun. 4, 2002

(54) METHOD AND APPARATUS FOR PREVENTING CRACKING OF THE SHANK JUNCTION OF DIE BLOCKS

(75) Inventors: Charles W. Finkl, Chicago; Algirdas A. Underys, Arlington Hts., both of IL (US)

(73) Assignee: A. Finkl & Sons Co., Chicago, IL (US)

( * ) Notice: Subject to any disclaimer, the term of this patent is extended or adjusted under 35 U.S.C. 154(b) by 0 days.

(21) Appl. No.: 09/160,895

(22) Filed: Sep. 25, 1998

Related U.S. Application Data (63) Continuation-in-part of application No. 08/582,373, filed on Jan. 11, 1996, now abandoned.

(51) Int. Cl.[7] .................................................. C21D 1/04
(52) U.S. Cl. ...................... 148/566; 148/565; 148/567; 148/572; 148/639; 148/640; 219/635; 219/646
(58) Field of Search ................................ 148/565, 566, 148/567, 572, 640, 639; 219/635, 646

(56) References Cited

FOREIGN PATENT DOCUMENTS

| JP | 60036621 | * | 2/1985 |
|----|----------|---|--------|
| SU | 461956 | * | 10/1975 |
| SU | 505719 | * | 4/1976 |
| SU | 802383 | * | 2/1981 |
| SU | 817079 | * | 3/1981 |

* cited by examiner

Primary Examiner—Sikyin Ip
(74) Attorney, Agent, or Firm—James G. Staples (57) ABSTRACT

A method and apparatus for tempering the shank portion only of die blocks which comprises subjecting the shank portion of a die block or other large metal part to electrical energy derived from induction heating or infrared heating to a controlled depth, preferably just sufficiently deep to temper the shank portion but not sufficiently deep to temper the hardened working portion of the part.

10 Claims, 6 Drawing Sheets

METHOD AND APPARATUS FOR PREVENTING CRACKING OF THE SHANK JUNCTION OF DIE BLOCKS

This application is a continuation-in-part of application Ser. No. 08/582,373 filed Jan. 11, 1996 now abandoned.

This invention relates to a method and apparatus for eliminating or at least drastically reducing the cracking which today frequently occurs at the junctions of the body and shank of ferrous alloy die blocks and similar parts.

BACKGROUND OF THE INVENTION

Die blocks are well known forging implements which, after the sinking of an impression therein to thereby form a die, are used in forging machines such as hammers. A hammer die, after final machining and heat treatment, is then fitted to a die holder in the hammer. A typical hammer die has a large thick body (to provide for one or more resinkings of the impression) and, usually, a relatively short, dovetailed shaped shank located in the middle of one side of the body and extending the length of the body. A typical shank is about 2" in height.

In operation a hammer die is exposed to extremely rugged conditions. In normal operations with all machine components properly positioned and secured, tremendous shock loads are transmitted to all portions of the die. Such loads, which are derived from the many tons of impact forces resulting from the weight of the downwardly driven ram portion of the hammer die striking the workpiece resting in the die holder of the hammer die, have their greatest effect on the weakest portion of the die which, as is well known, is the junction of the shank and body of the hammer die. All too frequently the dies, which may range in hardness from about 28Rc to about 54Rc, are cracked or fractured at the shank-body junction of the die and this can lead to catastrophic failure.

Many forging die applications require a tool steel die block that has been heat treated to a high hardness level to optimize the wear resistance of the working face. At the same time the shank portion of the die block requires a lower hardness level to facilitate machining and prevent cracking of the filet radius during the forging process. The "composite" design is achieved by heat treating the entire block to the high face hardness and then selectively tempering the shank portion at a tempering temperature higher than that used to temper the entire block.

Salt Bath Shank Tempering

In the current practice the shank is tempered by immersing a portion of the previously heat treated and hardened die block into a bath of molten metal salt containing barium chloride ($BaCl_2$) at a temperature of 1250° F. (677° C.). Heat from the molten salt is conducted into the submerged portion of the die block, is transmitted through the block, and is lost through radiation and convection from the portion of the block exposed to the ambient air above the salt. After approximately 180 minutes a steady state heat transfer condition is established where the highest temperature of approximately 1250° F. (677° C.) is present at the submerged corner. The temperature decreases to approximately 1050° F. (566° C.) at the salt immersion depth. The temperature continues to decrease toward the top surface of the die block exposed to the ambient air. The final temperature at the top (working face) of the die block depends on the depth immersion and total height of the die block. It is imperative that the working portion of the die block remain below the original die block tempering temperature to prevent softening of the working face. The metallurgical effectiveness of the shank tempering process depends on the combination of the temperature achieved and time held at that temperature. The current practice specifies a total salt bath treatment of 6 hours (3 hours after steady-state is reached) to allow for sufficient tempering of the shank portion.

Problems with Salt Bath Shank Tempering

Technical, maintenance, environmental, and safety problems limit the commercial success of the current process. Technically the process is limited by the relatively slow rate of heat input generated by the molten salt at 1250° (677° C.). The slow heat input rate coupled with the heat lost due to radiation and convection from the portion of the block exposed to the ambient air limits the maximum temperature within the block, at that salt immersion depth, to approximately 1050° F. (566° C.). The extent to which the shank is selectively tempered is limited by the temperature achieved in the shank portion of the die block and the time held at temperature. The maximum temperature of the top (working face) must remain below the original tempering temperature of the parent block to prevent softening. This maximum working face temperature depends on the depth of immersion into the salt bath (heat input) and the height of the block above the salt bath (heat output). For small blocks it is impossible to sufficiently temper the shank portion without softening the working face due to the relatively small portion of the block above the salt bath. Further the process is somewhat time consuming requiring a batch processing time of six hours. It is possible to increase the effective tempering temperature at the salt immersion depth and decrease the batch processing time by increasing the temperature of the molten salt bath, however, this only increases the maintenance, environmental, and safety problems associated with the process.

Several maintenance problems hinder the commercial success of the salt bath shank tempering process. Costly stainless steel pots are used to contain the molten salt used for the shank tempering process. These pots are corroded by the salt and require replacement approximately every eight months resulting in an annual cost of $5,700. Any increase in salt pot operating temperature will significantly reduce the life of the salt pots. The actual metal salt must be replenished at a cost of approximately $2,000 annually. In addition to the cost of these consumables is the annual cost of approximately $21,000 for the natural gas used to heat the pot. Additional costs are associated with the maintenance of the burners, themocouples, and the control systems.

Several environmental and safety problems plague the use of the salt bath shank tempering process. The barium chloride contained in the salt is considered a hazardous waste under the Resource Conservation and Recovery Act due to its barium content which is a heavy metal and requires special disposal procedures. Overexposure to this salt can lead to several varied health risks. Skilled operators are required to conduct the salt bath processing due to the many safety hazard associated with the molten salt. Extreme care must be taken to avoid the introduction of water into the molten salt. Condensation or ice that may have accumulated on the die blocks will become explosive upon contact with the molten salt if not thoroughly removed prior to immersion in the bath. If moisture is introduced the rapid conversion to steam can splatter the molten salt onto adjacent personnel. Care must also be taken when placing blocks into the salt bath to avoid inhalation of the powdered metal salt when loading the pot. Because of these environmental and safety concerns it is required that any salt bath tempering process must be located in a specialized shop area.

Following the salt bath treatment the blocks must be stored until cool. Next, the salt that adheres to the sides of the block must be removed prior to the moving the blocks to the next operation. Again this is required to contain the metal salt and prevent contamination of other locations. The same precautions must be maintained when handling the salt that is removed from the sides of the block.

The results of such treatment, while better than no treatment, are, in a sense, marginal since the process is difficult to regulate and measure with precision and a substantial element of judgment enters into the practice of the process, even on a day-in-day-out routine basis. Further, the process is lengthy, often requires the use of cranes or other auxiliary equipment to manipulate, hold and control the position of the die block during the salt bath treatment. The blocks, which are custom made, are of different sizes, shapes and widths, and this non-uniformity makes it even more difficult to properly reduce the hardness at the inside corner of the shank cut-out.

In summary the operating drawbacks to the salt bath system may be summarized as follows:

1. Salt pot has to be replaced twice a year at a cost of approximately $4,000.
2. The salt bath is a toxic waste and disposal is difficult.
3. Salt pot is labor intensive.
4. Salt pot has to be in a special, protected location.
5. Splash and inhalation from the salt is dangerous to the operator.
6. Periodic cleaning is necessary.
7. Salt sticks to sides—has to be washed off.
8. There is a danger of explosion due to the presence of water or ice on the die block.

There is therefore a need for a method and apparatus for preventing, or at least reducing the incidence of; cracking at the shank-body junction of die blocks which is speedy in application, requires minimal handling of the die block to be treated, minimal auxiliary equipment during processing, eliminates the use of hot, liquid salt baths with their above described drawbacks, and gives predictable and duplicatable results over the range of sizes, shapes, and compositions of die blocks currently produced.

SUMMARY OF THE INVENTION

The invention is a shank-body drawing or tempering system utilizing electric heat that eliminates the need for the currently used salt baths with their attendant drawbacks as described above, yet which can process all shapes, sizes and compositions of die blocks in a speedy, efficient and reproducible manner with consistent results, while requiring only a fraction of the cost of capital equipment and operating costs of salt baths, including savings in manpower, space and consumable materials.

In a first embodiment of the invention paddle shaped induction heater means are placed in operative contact with a ferrous workpiece and an enclosure which does not transmit induction currents, said paddle including induction heating coil means having a capacity to heat the critical areas of the die block to any desired depth and any degree of softness using well known operating parameters currently utilized in induction heating devices. Preferably a die block is placed, in a shank down position, on a non-magnetic base and an induction heating paddle is placed in contact with the shank, the exposed portion of the paddle being blocked off with non-magnetic material. The water cooled copper tube induction coil, which is encased in a non-magnetic jacket, is activated for a sufficient period of time, depending on size, shape and composition of the workpiece, to temper the shank-body junction to a condition in which cracking is either eliminated or drastically reduced as contrasted to the results currently achieved with salt baths or other means.

In another embodiment of the invention the die block after hardening but either before or after a shank is formed in the back side (i.e.: the non-working surface) of the die block is subjected to infrared heat. The infrared heat is preferably generated by tungsten halogen lamps which are arranged to direct the radiant energy at the surface to be treated. While no limits on the length of the waves of the electromagnetic spectrum have been positively established, good results have been obtained with short wave radiation, i.e.: 0.78 to 2.0 $\mu$m.

DESCRIPTION OF THE DRAWING

The invention is illustrated more or less diagrammatically in the accompanying drawings wherein.

DETAILED DESCRIPTION OF THE INVENTION

In the following detailed description of the invention like reference numerals will be used to refer to like parts from Figure to Figure in the drawing.

Figure 1:
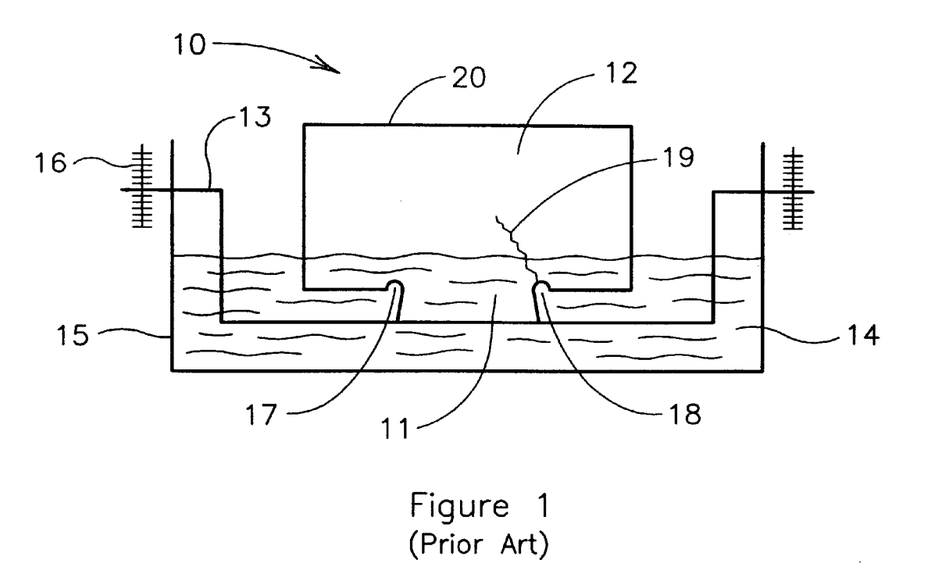
FIG. 1 is a view of a current prior art salt bath process and system for eliminating cracking at the shank-body junctions of die blocks.

Referring first to FIG. 1 the current procedure, labeled Prior Art, for reducing cracking at the shank-body junction of a die block is there illustrated. A die block is indicated generally at 10, the die block having a shank 11 and a body indicated at 12. The die block is shown positioned shank down on a special basket 13 in a salt bath 14 held in tank 15. If the vertical dimension of the shank is about 2 inches, which is a conventional shank dimension of ferrous alloy die blocks currently intended for impact forging, such as hammer machines, it will be noted that the depth of the bath is about 3–4 inches, and thus about 1–2 inches of the body 12 of the die block 10 is submerged in the bath 14. The depth to which the block is submerged can be adjusted as needed by adjustment mechanism 16. Since the block 10 can be quite large, for example two feet or more in width together with lengths into double figures, the block represents a very substantial heat sink. As a result, to heat a block, or several blocks if the tank 15 is used to capacity, a large number of calories will be absorbed by the blocks from the hot liquid and hence temperature measuring equipment must be used to continuously monitor the temperature of the bath, and provisions made to add heat to the bath, usually gas burners located beneath the tank. It will be seen that the shank-body junction on either side of the shank has had a fillet formed therein, indicated at 17 and 18. Even with such procedures and precautions, cracking remains a problem. A typical notch crack, as it is called, is indicated at 19. If the crack is severe enough it may extend all the way through to the die face 20 in which event the die is either a total loss or a large amount of rework, including welding and possibly even banding, must be performed, to put the die back into working condition. Even if the crack extends only part way into the body 12 and assuming the operator is alert enough to notice it after it begins, the die must be immediately taken out of production and reworked. Hence down time with all the well known adverse consequences of lost production, are encountered. It should be understood that, more often than not, the block 10 will not have a shank 11 when salt bath treated. A shanked block has been shown for ease of understanding and particularly to illustrate crack 19.

Figure 2:
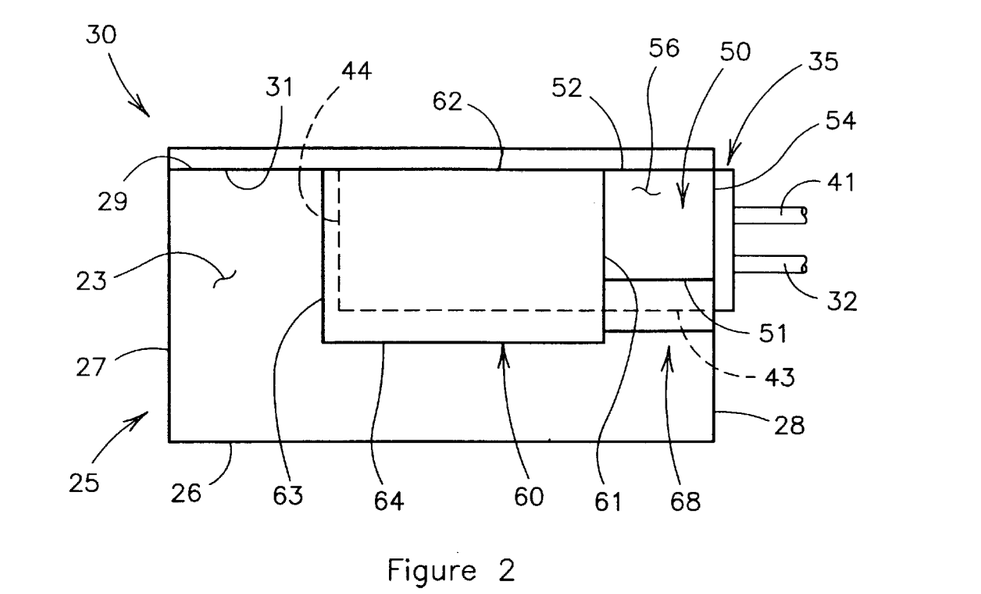
FIG. 2 is a top plan view of the system of the invention showing a die block being treated.
Figure 3:
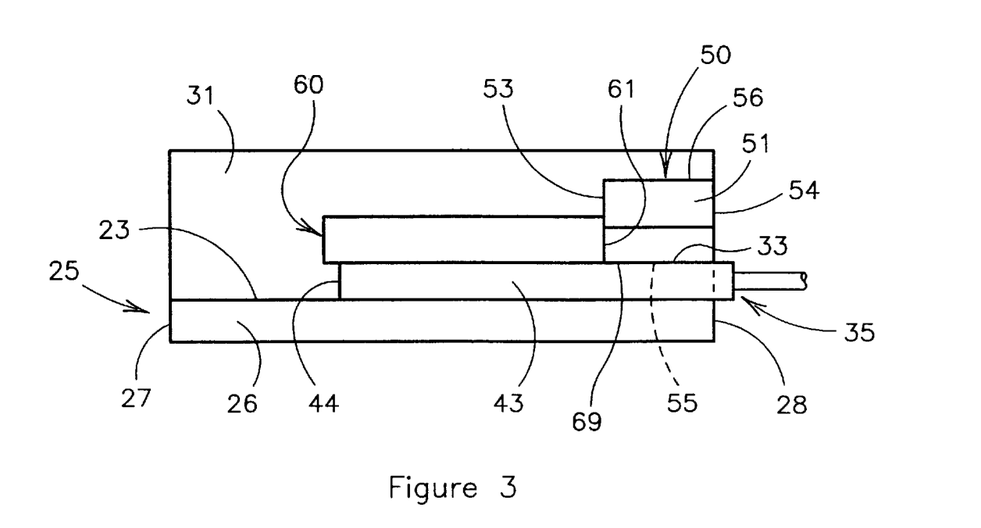
FIG. 3 is a front view of FIG. 4 with parts omitted for clarity.

Referring now to FIGS. 2 and 3 a table is indicated generally at 25, said table being composed of a material which does not conduct induction heating currents. A stainless steel or even a granite or suitable ceramic material may be used in the construction of table 25. The table has a front edge 26, left edge 27, right edge 28 and rear edge 29. A backing plate is indicated generally at 30, the lower portion of which, in this instance, is butted against rear edge 29 of the table 25. As can be best seen in FIG. 3, backing plate 30 extends upwardly a substantial distance so that its front face 31 forms an abutment wall of considerable height.

Figure 5:
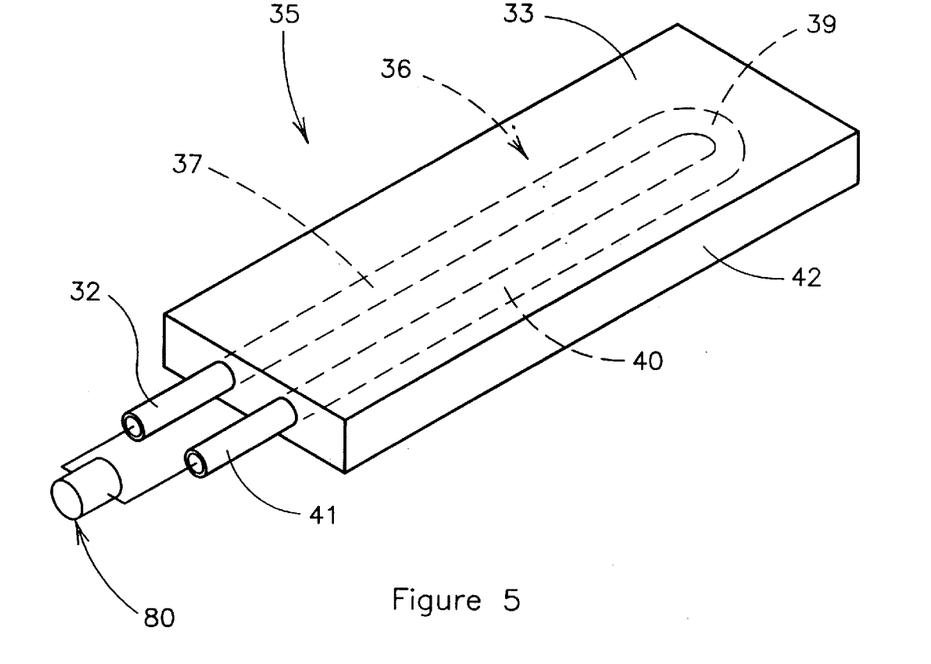
FIG. 5 is a perspective, partly diagrammatic view of the induction heating paddle used in the invention.

Referring now to FIG. 5 an indication heating means which may be referred to as a paddle is indicated generally at 35. Paddle 35 is an induction heating coil system composed of a length of continuous, hollow copper tubing, indicated generally at 36, said tubing having an inlet 32, an entry run 37, a bend 39, a return run 40 and an outlet 41. The hollow, fluid tight tubing is enclosed in a steel jacket, indicated at 42, whose width and length dimensions can be of virtually any desired measurements and whose height can vary to a considerable extent. It will be understood that the longer the length the greater will be the heat generated, and hence either the greater must be the cooling water flow rate through the tubing, or the larger must be the diameter of the tubing so as to carry enough coolant to remove the heat generated during the process. It will be understood that the paddle may, if desired, be made in two longitudinal sections so that one or more intermediate, mating sections, each with its own length of copper tubing may be added to the paddle to increase or decrease its width as desired, the short lengths of tubing in the added sections being mated to ends of the copper tubing in bend 39. The top face of the paddle is indicated at 33.

Referring now to FIGS. 2 and 3 particularly, the paddle 35 is shown laying flat on the upper surface 23 of table 25, and butted against the front face 31 of backing plate 30 at the table-backing plate junction. The relationship of the front edge 43 and the left edge 44 of the paddle 35 to the backing plate 30 is shown best in FIG. 2.

A through hardened rectangular die block is indicated generally at 50 resting upon the right end portion of paddle 35. The die block, which, in this instance, does not have a shank formed in it, is defined by front side 51, rear side 52, left edge 53, right edge 54 all sides and edges being planar, bottom 55 and top 56. As can be appreciated form FIG. 3, the entire surface area of the bottom 55 of block 50 is in surface abutting contact with the top surface 33 of the paddle 35.

It will be noted that the surface area of paddle 35 is considerably larger in both length and width directions than the dimensions of block 50. In this condition, and in order to ensure efficient operation of the induction heating coil paddle 35, the exposed surfaces of paddle 35 are covered with blocks of material which do not conduct induction heating currents. In this instance a large block 60 is placed on the left end portion of the paddle 35. The right edge 61 of block 60 is placed on the left end portion of the paddle 35. The right edge 61 of block 60 butts against the left edge 53 of the die block and the rear edge 62 of block 60 butts against front face 31 of the backing plate 30. As can be best seen in FIG. 2, the left edge 63 and front edge 64 of block 60 slightly overlap the rear edge 44 and the front edge 43 of the paddle.

A second block, or blocker, is indicated generally at 68. The bottom 69 of block 68 overlies, in surface abutting engagement, the portion of the right portion of paddle 35 which is not covered by die block 50.

It will thus be seen that the surface of die block 50 which is to be drawn is in contact over its entire surface area with paddle 35, and all portions of the upper surface 33 of paddle 35 which are not covered by the die block have been covered by a blocker so that the upper surface 33 of the paddle is not exposed to the atmosphere.

Figure 4:
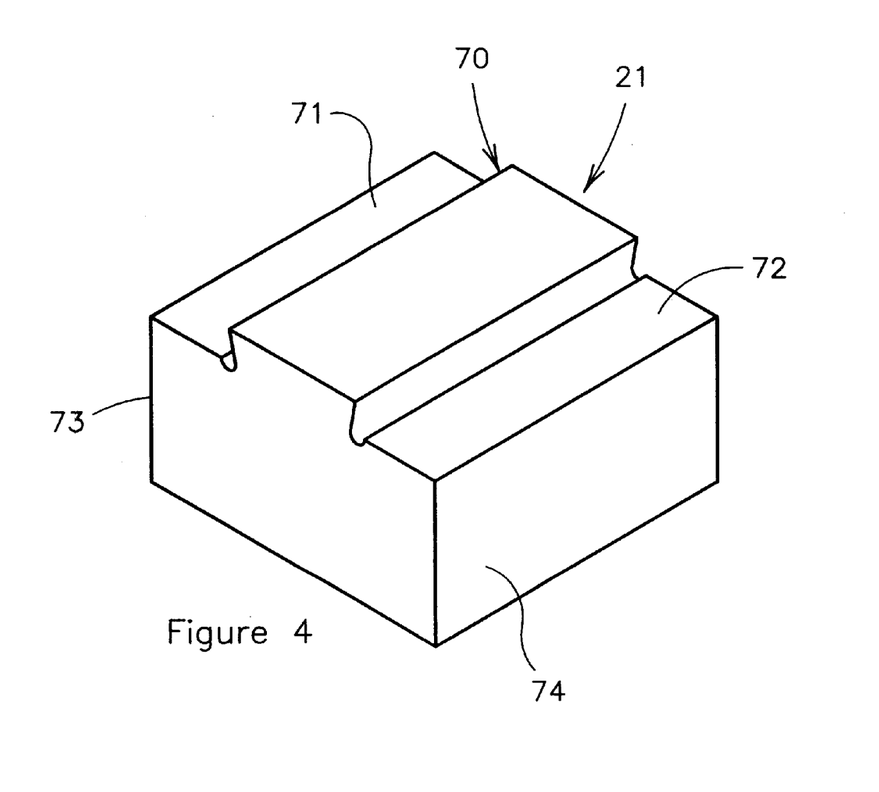
FIG. 4 is a view of a die block with which this invention may be used, the die block being illustrated in a final machined, shank up position.

In FIG. 4 the block 50 has been removed following treatment, and a shank 21 machined into the non-working face thereof. Specifically, the shank 21 may, for example, have a width 70 of about 4 inches with the left and right sides thereof having a dimension of about 2 inches, and shoulders, or die wings, 71, 72 of about 10-½ inches, so that the total width of the block is about 25 inches. The vertical dimension of left and right sides 73, 74 may be about 9–11 inches, for example, and the length of the sides 73, 74 may be, for example, 16 inches, though in actuality the length will vary widely; indeed the length dimension of sides 73 and 74 may be of virtually any size, up to and including 8 or 10 feet. Alternatively, fillets may be formed at the shank-body junctions.

By way of comparison, in the salt bath system a rack is usually required for pieces up to about 8,000 pounds during treatment. Above this weight and size tongs, which are controlled by a crane, must be used. As a consequence, for processing which requires a rack the piece dimension should have practical optimum measurements of about 26 inches wide by 48 inches in length by 22 inches in height, with an absolute maximum of about 28 inches wide and 50 inches long. If no rack is used the preferred optimum dimensions are about 38 inches wide by 48 inches long with an absolute maximum of 40 inches wide by 50 inches long. Although the above figures may vary to some degree form installation to installation they illustrate the fact that there is a practical maximum limit to the size dimensions which can be accommodated in the prior art salt bath system.

In operation as shown in FIGS. 2 and 3, when the induction coil is energized, the induction current acts only in the metal components, and specifically only in that portion of the block 50 which overlays paddle 35. A coolant system, including a pump P, is indicated generally at 80 for circulating coolant under suitable and conventional pressures in the copper tubing 32, 37, 39, 40 and 41. The runs of the copper tubing are connected to the power source in a conventional manner. As an example, the application of 60 cycle current for from 15–30 minutes will usually be sufficient to raise the temperature to about 1130° F. in the surface 55 of the block 50, which temperature, while sufficient to adequately temper the eventual shank-body junction area shown in FIG. 4, will not overheat a cavity which has been previously sunk in the die block.

Although a single paddle which, in this instance spans the entire distance between the right side of the body and the shank has been shown, it will be understood that it may be more convenient in other set-ups to use two small paddles.

When the system is not in use, no equipment must be maintained and no special precautions need be taken to ensure the safety of personnel in the area. The paddle 30 will promptly cool down to near room temperature after the power is shut off and the coolant circulated for a few minutes, and the heat pick-up by the large granite nonmagnetic base 25 and the blockers 60, 68 will be minimal.

The infrared energy embodiment of the invention is illustrated in FIGS. 6–9.

Factors of importance in the use of infrared energy are: (1) the absorption characteristics of the material being heated; (2) the power density of the radiating area on the part; (3) the ratio of convected heat to radiant heat; (4) the geometry of infrared emitters and reflectors including furnace design; and (5) the type of control required.

Infrared energy is the portion of the electromagnetic spectrum between 0.78 and 1000 $\mu$m. The infrared electromagnetic spectrum can be divided into three divisions: (1) short wave 0.78 to 2.0 $\mu$m, (2) medium wave 2.0 to 5.0 $\mu$m, and (3) long wave 5.0 $\mu$m to 1 mm. The actual emission spectrum of a given source is dependent upon its temperature. Increasing the source temperature will result in shorter overall wavelengths of the energy. This also corresponds to an increase in the overall emissive power. Increased temperature rise of the part can be achieved by increasing the heat transfer, dwell time, or the amount of infrared incident on the target. The wavelength of light utilized in the herein described system, approximately 1.2 $\mu$m, will allow for maximum percent emissive power. This wavelength is produced by glowing the tungsten halogen filaments at approximately 4892° F. (2750° C.).

Figure 6:
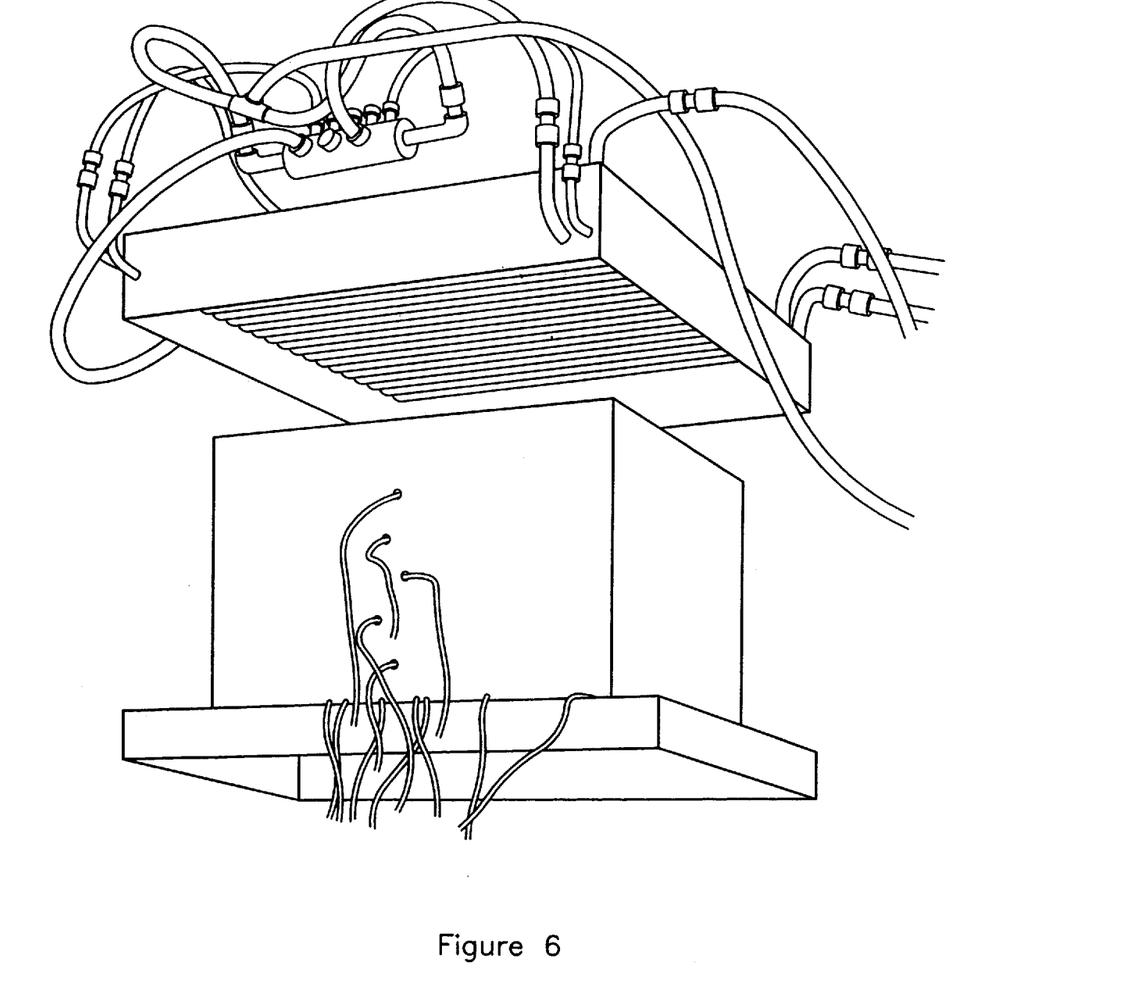
FIG. 6 is a perspective view, in an open position, of a simple non-insulated infrared furnace utilizing linear tungsten halogen tubes arranged in a rectangular shape corresponding to the shape of the surface of the illustrated die block which is to be softened.

The infrared furnace of FIG. 6 is a cold wall furnace; i.e.: only the work piece is heated to the desired temperature, and the furnace utilizes 100 W per linear inch elements. Due to the low thermal mass of the heating elements, the furnace is capable of its full heat flux in approximately 2 seconds after start-up Also, due to its cold wall design, the furnace cools extremely quickly.

In one demonstration, approximately 12 infrared heat treatments were performed on an 18-×22-×12-in.-thick steel block instrumented with 12 thermocouples located at various depths and locations throughout the block. A maximum of 51.2 kW was utilized on the top surface (22 by 18 in.) of the steel block with an infrared flat panel for 47 minutes prior to cutting back the power to maintain the surface temperature of the block at 1320° F. (716° C.). After 1 hour and 18 minutes, the furnace had to be held at 21.4 kW to maintain the given temperature.

A series of experiments were performed in order to see the effects of several variables, including: (1) surface oxide—(a) unoxidized, and (b) heavily oxidized (i.e.: scale); (2) block insulation—(a) insulating the upper 2.5 in. of the block, and (b) insulating the entire block; (3) edge heating effects; and (4) modeling was also accomplished in order to observe approximate efficiencies.

Figure 7:
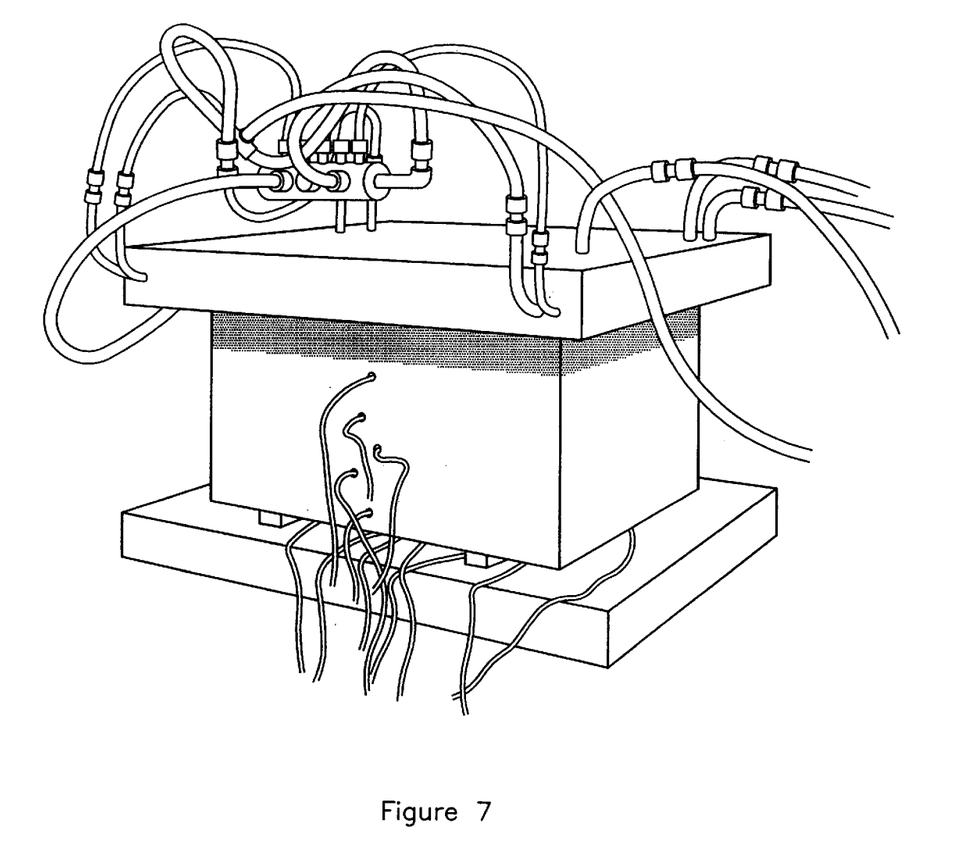
FIG. 7 is a perspective view of the infrared furnace of FIG. 6 in an operating position.

The block was initially heated with a heavy oxide scale in order to observe the effects of this heavy loose scale on the infrared heating. A second experiment was performed with the surface of the block ground revealing unoxidized steel. It was observed that this had little effect on the overall heating due to a couple of factors. The furnace was positioned over the steel block as shown in FIG. 7 os that any light not absorbed by the block would be reflected back to the highly nonabsorbing body and reflected back to the steel block. The surface of the steel block exceeded 752° F. (400° C.) in less than 10 minutes which is the temperature at which oxidation of the steel will occur and the surface will absorb over 90% of the incident light.

Due to installation of a new multichannel data acquisition system and the need for real time power output of the furnace for modeling, an additional experiment was performed. As can easily be observed in Table 1, the surface of an approximately 1500-lb die block can be brought to the upper tempering temperature in less than 48 min, utilizing less than 52,000 W, and then has to continuously be decreased to 21,000 W to maintain the surface temperature.

TABLE 1

Infrared power flux profile during heat treatment of a die block

| Infrared power flux (W) | Time at power flux (min, s) |
|---|---|
| 51,525 | 47, 40 |
| 49,625 | 2 |
| 46,841 | 1 |
| 45,181 | 1 |
| 42,933 | 1, 50 |
| 41,809 | 1, 10 |
| 40,685 | 2, 40 |
| 39,614 | 2, 10 |
| 38,704 | 1, 50 |
| 36,830 | 2 |
| 33,725 | 3, 10 |
| 36,402 | 4, 20 |
| 33,136 | 10, 30 |
| 30,995 | 7, 20 |
| 30,246 | 8 |
| 29,443 | 9 |
| 27,837 | 3, 30 |
| 26,980 | 22, 50 |
| 25,695 | 5, 20 |
| 25,321 | 1, 40 |
| 23,554 | 15, 10 |
| 22,483 | 49, 10 |
| 21,413 | 31, 50 |

Figure 8:
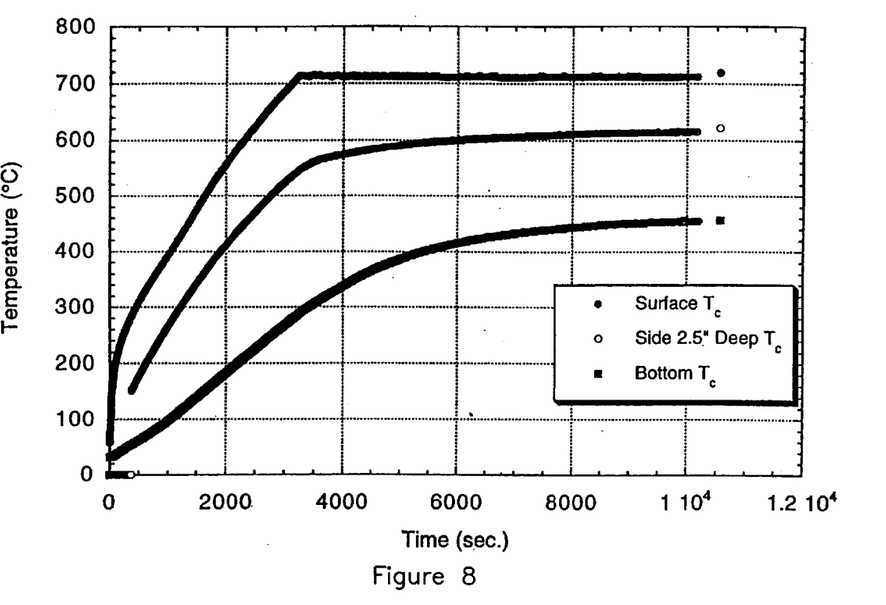
FIG. 8 is an infrared heating profile in a non-insulated furnace with a surface hold at 1320° F. for 3.5 hours.

In a subsequent procedure, a hardened block was treated to preferentially soften the back 2.5 in. Three thermocouples were attached to the block to monitor temperature during the softening process at the surface, 2.5 in. down the side and on the back side. This block was about two-thirds the size of the block utilized for all of the temperature profiling of FIG. 7. The block with a 2.5-in. insulation wrap was heat treated at 1320° C. for 3-½ hours with the infrared furnace, and the temperature profile is shown in FIG. 8.

Figure 9:
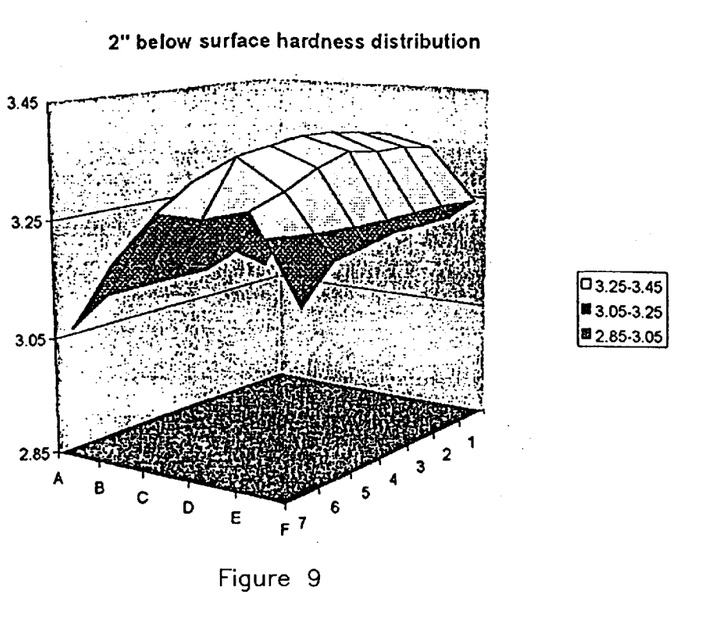
FIG. 9 is a hardness profile for an infrared heat treated die block.

The foregoing results indicate that infrared sources can effectively reduce the hardness of a prehardened die block. The block hardness was 2.95 BID (429 HB). To verify the softening effect of the infrared heat source, the following procedure was used: (1) 0.5 in. of material was removed, and (2) Brinnel hardness tests were taken over the surface using a 2-by 2-in. grid. This procedure was performed until the hardness was measured at a distance of 2 in. below the heated surface. As can be seen in FIG. 9, the hardness 2 in. below the surface is an average of 3.26 BID (350 HB). The "crowned" shape of the hardness distribution could be due to the loss of infrared energy from the sides of the block or from the natural hardness distribution from edge to edge of the block.

In conclusion it can be seen that infrared can be readily utilized to preferentially soften die steel to a given depth. Results to date suggest efficiencies on the order of almost 86%. Therefore, combining the fact that the infrared system can be readily turned on and off in seconds and results in no environmental hazards, the infrared system has very considerable cost savings over the conventional salt bath system.

It will thus be seen that a method and apparatus utilizing electrical energy has been disclosed for preventing cracking at the shank-body junction of die blocks which is speedy in application, requires minimal handling of the die block undergoing treatment, eliminates the need for the use of auxiliary equipment during treatment, eliminates the use of hot, liquid salt baths with their attendant drawbacks including environmental concerns, and which gives predictable, and duplicatable, results over a wide range of sizes, shapes and compositions of ferrous alloys.

Although a preferred embodiment of the invention has been illustrated and described, it will at once be apparent to those skilled in the art that modifications may be made within the scope of the invention. Accordingly it is intended that the scope of the invention not be limited by the foregoing exemplary description but solely by the hereafter appended claims when interpreted in light of the relevant prior art.

What is claimed is:

1. In a method of conditioning a shank portion of a pre-hardened die block, said pre-hardened die block having a working side and a mounting side, comprising the steps of:

providing a pre-hardened die block having (a) a working surface whose peripheral edges lie in a single flat plane, (b) a shank portion whose exterior surface lies in a single flat plane, (c) the planes of said working surface and said shank portion lying parallel to one another, (d) said parallel planes being located on opposite sides of said pre-hardened die block, and (e) said opposite sides being the working side and the mounting side of said die block, said pre-hardened die block having a final hardness level including its working surface, the portion of said fully hardened die block located on the mounting side of the fully hardened die block opposite said working surface having a depth of about two inches extending in a direction from an exterior surface toward said working surface, treating said two inches deep opposite portion by subjecting it to an electrical source of heat having a temperature higher than the original tempering temperature of the fully hardened die block, subjecting the remaining portions of the fully hardened die block which are not exposed to the electrical source of heat to ambient conditions, including ambient atmosphere, while said treated portion is subjected to said electrical source of heat, maintaining the subjection of said opposite treated portion to said electrical source of heat until the original tempering temperature of the hardened die block is exceeded in the said opposite portion and thereby the hardness of said treated portion is decreased to a value below the hardness of the remainder of the die block, terminating the subjection of said opposite portion to said electrical source of heat after said opposite portion is softened, as contrasted to the fully hardened working surface, to a depth of about two inches below said exterior surface, whereby the treated portion acquires an easily machineable condition of at least about two inches in depth opposite the working surface, whose initial hardened condition is unchanged, for the formation of a shank.

2. The method of claim 1 further characterized in that the electrical source of heat is in abutting contact with the shank portion of the die block.

3. The method of claim 2 further characterized in that the electrical source of heat is induction heating coil means.

4. The method of claim 1 further characterized in that the electrical source of heat is spaced from the shank portion of the die block.

5. The method of claim 4 further characterized in that the electrical source of heat is infrared heating means.

6. The method of claim 5 further characterized in that the infrared heating means are tungsten halogen lamps arranged to direct infrared energy onto the shank portion of the die block.

7. The method of claim 6 further characterized in that the tungsten halogen lamps operate in the short wave division of the infrared electromagnetic spectrum.

8. The method of claim 7 further characterized in that the wavelength of the tungsten halogen lamps is approximately 1.2 $\mu$m.

9. The method of claim 8 further characterized in that the tungsten halogen lamps operate in a cold wall furnace.

10. The method of claim 9 further characterized in that the surface temperature of the shank portion reaches about 1320° F. during treatment.

* * * * *